United States Patent
Lee et al.

(10) Patent No.: US 7,667,788 B2
(45) Date of Patent: Feb. 23, 2010

(54) ILLUMINATION SYSTEM FOR FLAT PANEL DISPLAY DEVICE

(75) Inventors: Moon-gyu Lee, Suwon-si (KR);
Seung-ho Nam, Seongnam-si (KR);
Seong-mo Hwang, Seongnam-si (KR);
Young-chan Kim, Suwon-si (KR);
Dong-ho Wee, Gunpo-si (KR);
Kyung-yeup Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 11/499,682

(22) Filed: Aug. 7, 2006

(65) Prior Publication Data
US 2007/0047259 A1    Mar. 1, 2007

(30) Foreign Application Priority Data
Aug. 27, 2005    (TW) .................... 10-2005-0079127

(51) Int. Cl.
*G02F 1/1335* (2006.01)
*G02B 6/10* (2006.01)
*F21V 7/04* (2006.01)

(52) U.S. Cl. .............................. 349/65; 349/67; 349/66; 349/96; 349/112; 349/113; 385/130; 385/131; 385/11; 385/901; 362/615

(58) Field of Classification Search ................... 349/66, 349/64, 67, 87, 95, 96, 112, 113, 201, 1, 349/15, 65; 362/615; 385/36, 11, 129, 130, 385/131, 901
See application file for complete search history.

(56) References Cited

U.S. PATENT DOCUMENTS

| 5,587,816 | A | | 12/1996 | Gunjima | 349/62 |
| 5,751,388 | A | * | 5/1998 | Larson | 349/96 |
| 5,808,709 | A | | 9/1998 | Davis et al. | 349/65 |
| 5,845,035 | A | | 12/1998 | Wimberger-Friedl | 385/129 |
| 5,999,239 | A | * | 12/1999 | Larson | 349/96 |
| 6,310,671 | B1 | * | 10/2001 | Larson | 349/96 |

(Continued)

FOREIGN PATENT DOCUMENTS

EP    1 031 872 A1    8/2000

(Continued)

OTHER PUBLICATIONS

Blom S.M.P. et al: "Towards a Polarized Light-Emitting Backlight: Micro-Structured Anisotropic Layers", Journal of the Society for Information Display, Society for Information Display, San Jose, U.S., vol. 10, No. 3, 2002, pp. 209-213, ISSN: 1071-0922.

(Continued)

*Primary Examiner*—Brian M Healy
(74) *Attorney, Agent, or Firm*—Sughrue Mion, PLLC

(57) ABSTRACT

An illumination system for a flat panel display device includes: a light guide plate made of an optically isotropic material; a light source disposed at a side of the light guide plate; an upper layer disposed on a top surface of the light guide plate and made of an optically anisotropic material; and a polarization selection emitting structure which is disposed at an interface of the light guide plate and the upper layer. The upper layer has two different refractive indices and one of the two refractive indices is the same as a refractive index of the light guide plate. In the polarization selection emitting structure differently polarized light is differently refracted, reflected, diffracted, or scattered based on polarization direction.

11 Claims, 3 Drawing Sheets

U.S. PATENT DOCUMENTS

| | | | |
|---|---|---|---|
| 6,853,413 B2 * | 2/2005 | Larson | 349/96 |
| 2003/0058383 A1 | 3/2003 | Jagt et al. | 349/65 |
| 2004/0095550 A1 * | 5/2004 | Tai | 349/194 |
| 2004/0105159 A1 * | 6/2004 | Saccomanno et al. | 359/599 |
| 2007/0047259 A1 * | 3/2007 | Lee et al. | 362/615 |

FOREIGN PATENT DOCUMENTS

| | | | |
|---|---|---|---|
| JP | 6-331824 A | 12/1994 | 349/65 |
| JP | 09292530 A | 11/1997 | 349/65 X |
| JP | 2004126376 A | 4/2004 | 349/65 X |
| JP | 2004314539 A | 11/2004 | 349/65 X |
| WO | WO 97/22834 A1 | 6/1997 | 349/65 |
| WO | WO 01/90637 A | 11/2001 | |

OTHER PUBLICATIONS

Hugo J. Cornelissen et al: "38.3: Polarized Light LCD Backlight based on Liquid Crystalline Polymer FilmL A new Manufacturing Process", 2004 SID International Symposium, Seattle, Washington, May 25-27, 2004, SID International Symposium, San Jose, CA,: US, May 25, 2004, pp. 1178-1181.

Aphonin O A et al: "Optical Properties of Stretched Polymer Dispersed Liquid Crystal Films", Liquid Crystals, Taylor and Francis, Abingdon, GB, vol. 15, No. 3, Sep. 1, 1993, pp. 395-407.

* cited by examiner

ILLUMINATION SYSTEM FOR FLAT PANEL DISPLAY DEVICE

CROSS-REFERENCE TO RELATED PATENT APPLICATIONS

This application claims the benefit of Korean Patent Application No. 10-2005-0079127, filed on Aug. 27, 2005 in the Korean Intellectual Property Office, the disclosure of which is incorporated herein in its entirety by reference.

BACKGROUND OF THE INVENTION

1. Field of the Invention

Apparatuses consistent with the present invention relate to an illumination system for a flat panel display device in which light, incident on a light guide plate from a light source disposed at a side of the illumination system, is polarized to be emitted to a flat panel display device.

2. Description of the Related Art

Typical flat panel display devices include light emission type flat panel display devices and light receiving type flat panel display devices. Liquid crystal displays (LCDs), which are a type of flat panel displays, are light receiving type displays that are not self-luminescent but which form an image using incident light from an external source. Thus, an external light source, for example, a backlight system, is installed on a rear side of an LCD so as to provide light for an image. Backlight systems for LCDs are generally either direct light emitting type backlight systems or edge light emitting type backlight systems.

In edge light emitting type backlight systems, a linear light source is installed at an end of an LCD panel, and a light guide plate uniformly guides light emitted from the light source to a rear side of the LCD panel.

However, since the light emitted through the light guide plate in a conventional backlight system is unpolarized, it cannot be used in an LCD and needs to be polarized using a polarization unit. In this procedure, a considerable amount of the light energy is lost and energy efficiency is reduced. Moreover, the lost light energy is changed into thermal energy, causing problems such as overheating. Accordingly, there is a need for a more efficient illumination system which provides polarized light.

Recently, illumination systems have been suggested in which light of one polarization is emitted to a light guide and light of another polarization is recycled, thereby improving efficiency, as disclosed in U.S. Pat. Nos. 5,845,035 and 5,808,709.

In an illumination system disclosed in U.S. Pat. No. 5,845,035, a refractive index difference at an interface between an optically isotropic layer and an optically anisotropic layer causes the total reflection of light of one polarization, thereby dividing incident light into polarization component. However, since the refractive index difference at the interface is not large enough, as discussed in U.S. Pat. No. 5,808,709, a collimation unit is required. The collimation unit causes light to be incident on the light guide at an angle at which the light will be totally reflected. However, the collimation unit may be insufficient, causing inefficient polarization separation.

SUMMARY OF THE INVENTION

Exemplary embodiments of the present invention provide an illumination system for a flat pane display device in which polarization separation and recycling are performed in a light guide structure to improve energy efficiency and in which light of polarization is effectively separated and emitted without an additional collimation unit.

According to an exemplary aspect of the present invention, there is provided an illumination system for a flat panel display device comprising: a light guide plate comprising an optically isotropic material; a light source disposed at a side of the light guide plate; a upper layer disposed on a top surface of the light guide plate and made of an optically anisotropic material; and a polarization selection emitting structure which is formed at an interface of the light guide plate and the upper layer. The upper layer has two different refractive indices and one of the two refractive indices is the same as a refractive index of the light guide plate. In the polarization selection emitting structure, differently polarized light is differently refracted, reflected, diffracted, or scattered based on polarization direction.

The light guide plate and the light guide structure including the upper layer and the polarization selection emitting structure formed at an interface therebetween radiates the light incident from the light source uniformly to a flat panel display. A reflection mirror is formed on the lower surface of the light guide plate so that the light is emitted only from the upper portion of the light guide plate.

The upper layer may be a film formed of an optically anisotropic material or a coating layer. The upper surface of the upper layer may be flat. The polarization selection structure may be a predetermined solid pattern formed on the interface between the upper layer and the light guide plate or may be a periodic uneven structure. The polarization selection structure may be formed of a fine solid structure on the upper surface of the light guide plate on which the optically anisotropic film is bonded because it is difficult to form a solid structure on the surface of the optically anisotropic material and the shape is not limited to this.

For light having a first polarization, the index of refraction of the upper layer 30 is the same as the index of refraction of the light guide plate, and therefore, this light is transmitted through the interface of the light guide plate without reflection or refraction. For light having a second polarization direction, however, the index of refraction of the upper layer is different from that of the light guide plate, so this light is refracted, reflected, diffracted, or scattered at the interface between the light guide plate and the upper layer.

The light having the first polarization is totally reflected inside the upper surface of the upper layer, and is recycled within the light guide structure. The light guide plate is formed of an optically isotropic material, however, this naturally includes slight anisotropy. Accordingly, the totally reflected light gradually loses polarization as it travels inside the light guide plate, and is polarized and separated again while passing the through polarization selection emitting structure repeatedly. Thus, the light incident on the light guide plate can be emitted as light having the second polarization, thereby increasing the energy efficiency of the illumination system.

According to another exemplary aspect of the present invention, there is provided an illumination system for a flat panel device comprising: a light guide plate comprising an optically isotropic material; a light source disposed at a side of the light guide plate; and a light emitting layer comprising an optically isotropic matrix formed on a top surface of light guide plate and having the same refractive index as the light guide plate and a plurality of polarization sensitive scattering elements (PSSEs) which comprise an optically anisotropic material domain distributed in the matrix and aligned to have common optical directivity.

The polarization sensitive scattering elements (PSSEs) may have two different refractive indices, one of which is substantially the same as the refractive index of the matrix.

BRIEF DESCRIPTION OF THE DRAWINGS

The above and other exemplary aspects and advantages of the present invention will become more apparent by the following detailed description of exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
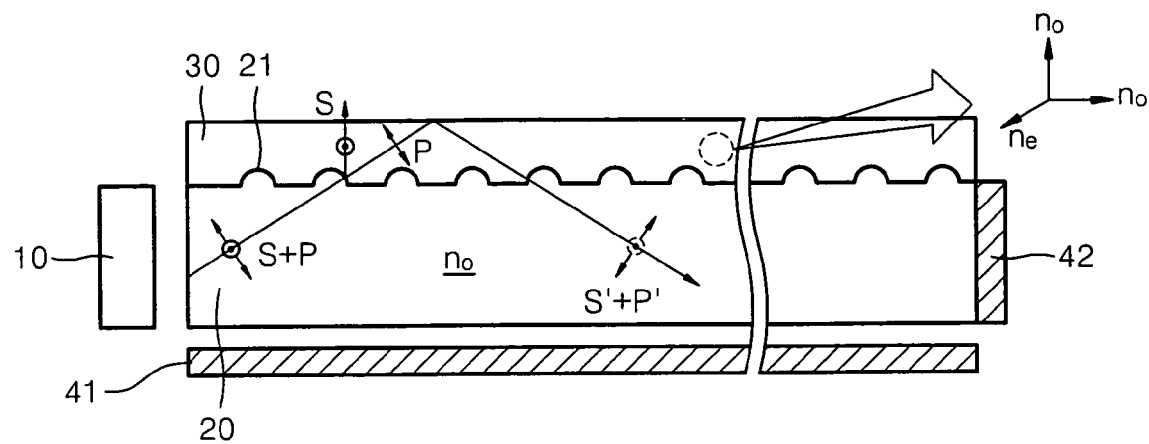
FIG. 1 is a cross-sectional view of an illumination system having a micro lens array structure at an interface between a light guide plate and an upper layer according to an exemplary embodiment of the present invention.

FIG. 1 is a cross-sectional view of an illumination system having a micro lens array structure on an interface between a light guide plate and an upper layer according to an exemplary embodiment of the present invention. The illumination system includes a light source 10 on at least one end and a light guide plate 20 through which incident light is transmitted. The illumination system further includes an upper layer 30, which may be a film or coating layer disposed on a top surface of the light guide plate 20.

The light guide plate 20 is formed of an optically isotropic material whose refractive index of $n_o$ is consistent and not directionally dependent. The upper layer 30 is formed of an optically anisotropic material whose refractive index varies directionally. In other words, in the direction of the z axis and in the direction of the y-axis, the refractive index $n_o$ of the upper layer 30 is the same as the refractive index of the light guide plate 20. In the direction of the x-axis, the refractive index $n_e$ of the upper layer 30 is different from that of the light guide plate 20. The y-z plane formed by the axes in which the refractive index of the upper layer 30 is $n_o$ is perpendicular to the plane of the light guide plate.

A fine, solid structure 21 is formed at the interface of the top surface of the light guide plate 20 and the bottom surface of the upper layer 30. The solid structure 21 may comprise a film bonded onto the top surface of the light guide plate.

The solid structure 21 may have any shape which satisfactorily refracts, reflects, diffracts, or scatters light, as would be understood by one of skill in the art. The solid structure 21 may be a micro lens array structure formed on the top surface of the light guide plate 20.

Furthermore, a reflection mirror 42 may be disposed on a side of the light guide plate 20 opposite the light source 10, and a reflection mirror 41 may also be disposed on the bottom surface of the light guide plate 20.

The polarization selection emitting operation in the illumination system according to this exemplary embodiment of present invention is as following. Unpolarized light S+P incident on the light guide plate 20 is incident on the solid structure 21. The upper layer 30 has two refractive indices $n_o$ and $n_e$, and one of them is the same as the refractive index $n_o$ of the light guide plate 20. Accordingly, for the p-polarized component of the incident light, the index of refraction of the upper layer 30 is the same as the index of refraction of the light guide plate, and therefore, the p-polarized component of the incident light is transmitted through the interface of the light guide plate 20 and the upper layer 30 without reflection or refraction. For the s-polarized component of the incident light, however, the index of refraction of the upper layer 30 is different from that of the light guide plate 20, so the s-polarized component of the incident light is refracted, reflected, diffracted, or scattered at the interface between the light guide plate 20 and the upper layer 30 and at the solid structure 21. Thereby, a considerable amount of the s-polarized light is incident on a display panel (not shown) through the top surface of the upper layer 30.

When p-polarized light is incident on the top surface of the upper layer 30, it is totally reflected due to the difference between the refractive indices of the upper layer 30 and the external atmosphere. The p-polarized light is then re-directed to the light guide plate 20. The light guide plate 20 is made of an optically isotropic material. However, this material is naturally slightly anisotropic; therefore, the p-polarized light is transmitted to the side reflection mirror 42 and the light is reflected towards the polarization selection emitting structure 21, to be separated into polarization components again. Thus, most of the incident light is emitted as s-polarized light.

The reflection mirror 41 disposed on the bottom surface of the light guide plate 20 reflects the s-polarized light which is then scattered to head for the display panel (not shown) above.

Figure 2:
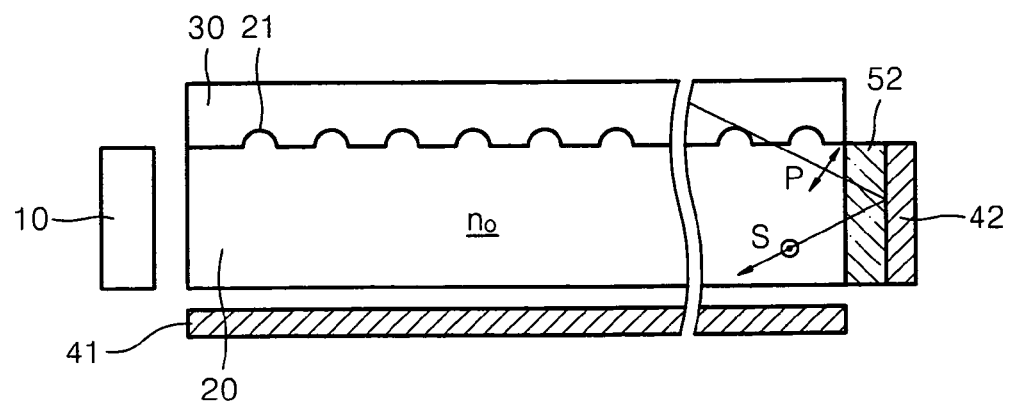
FIG. 2 is a cross-sectional view of an illumination system having a polarization converter and a reflection mirror at a side of the light guide plate according to another exemplary embodiment of the present invention.

FIG. 2 is a cross-sectional view of an illumination system for a flat panel display device having a polarization converter and a reflection mirror at a side of a light guide plate according to another exemplary embodiment of the present invention. The exemplary embodiment of FIG. 2 is nearly the same as the embodiment of FIG. 1. The only difference is that a polarization converter 52 is disposed between a side of the light guide plate 20 and the reflection mirror 42. The polarization converter 52 rotates the polarization axis of incident light by 90 degree and converts it into perpendicularly polarized light, and may be made of an optically anisotropic material layer or another predetermined optical structure as would be understood by one of skill in the art. The polarization converter 52 may be a quarter wavelength ($\lambda/4$) plate.

Referring to FIG. 2, when p-polarized light is transmitted through the polarization converter, is reflected by the mirror 42, and is transmitted again through the polarization converter, the axis of polarization is rotated, and at least a portion of the light is converted into s-polarized light.

Figure 3:
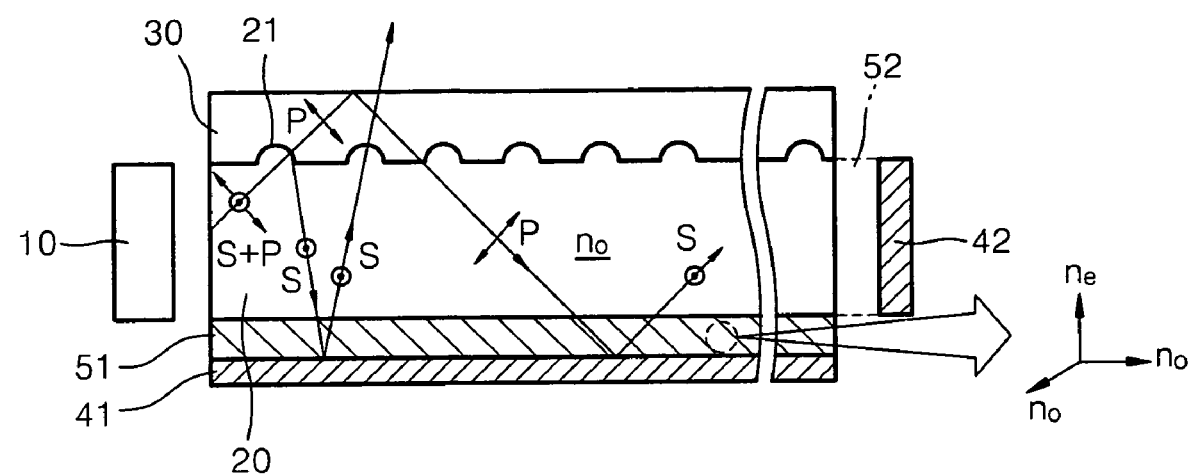
FIG. 3 is a cross-sectional view of an illumination system having a polarization converter and a reflection mirror on a bottom surface of the light guide plate according to another exemplary embodiment of the present invention.

FIG. 3 is a cross-sectional view of an illumination system having a polarization converter and a reflection mirror below a light guide plate according to another exemplary embodiment of the present invention. The exemplary embodiment of FIG. 3 is nearly the same as the embodiment of FIG. 1 or 2. The only difference is that a polarization converter 51 is disposed between the bottom surface of the light guide plate 20 and the reflection mirror 41.

When p-polarized light (which has passed through the solid structure 21, has been totally reflected at an upper surface of the upper layer 30, and has been transmitted through the light guide plate 20) is transmitted through the polarization converter 51, reflected by the mirror 41, and transmitted again through the polarization converter 51, the axis of the light is rotated and at least a portion of the light is converted into s-polarized light. The s-polarized light, which is refracted and reflected downward at a small angle by the solid structure 21, passes through the polarization converter 51, is reflected by the mirror 41, and passes again through the polarization converter 51 without a change in polarization.

The polarization converter 51 may be made of an optically anisotropic material layer or of another predetermined optical structure which selectively rotates an optical axis of a light beam or transmits a light beam without rotation, as would be understood by one of skill in the art. The polarization converter 51 may comprise an optically anisotropic material layer having two different refractive indices, one of which corresponds to the two horizontal axes perpendicular to each other and the other of which corresponds to the virtual axis.

Figure 4:
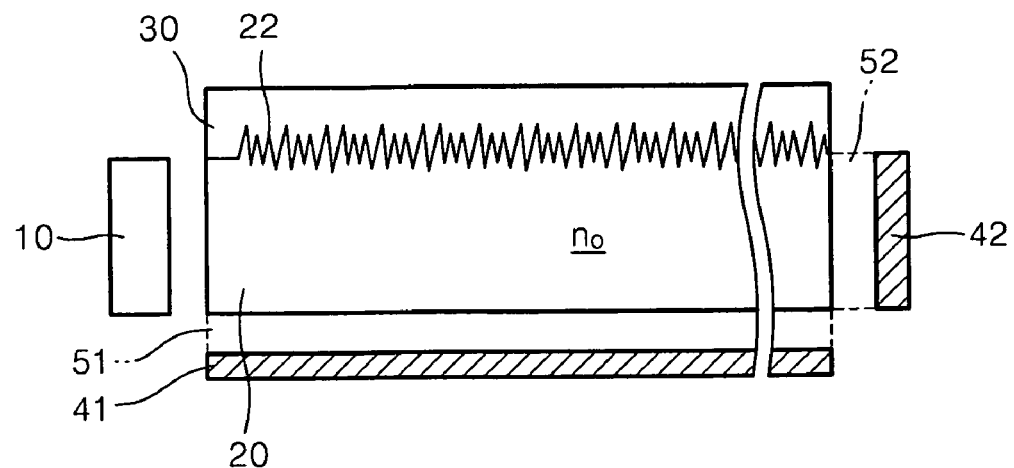
FIG. 4 is a cross-sectional view of an illumination system having a non-periodic uneven structure at an interface of the light guide plate and an upper layer according to another exemplary embodiment of the present invention.

FIG. 4 is a cross-sectional view of an illumination system having a non-periodic uneven structure at an interface of a light guide plate and an upper layer according to another exemplary embodiment of the present invention. The exemplary embodiment of FIG. 4 is nearly the same as one of the embodiments of FIGS. 1 through 3 except that a polarization selection emitting structure, that is, the solid structure 21 is not used. The polarization selection emitting structure 22 in a periodic or non-periodic solid structure may be a hologram pattern, or a non-periodic fine uneven structure made using an etching method or a sand blast method.

Figure 5:
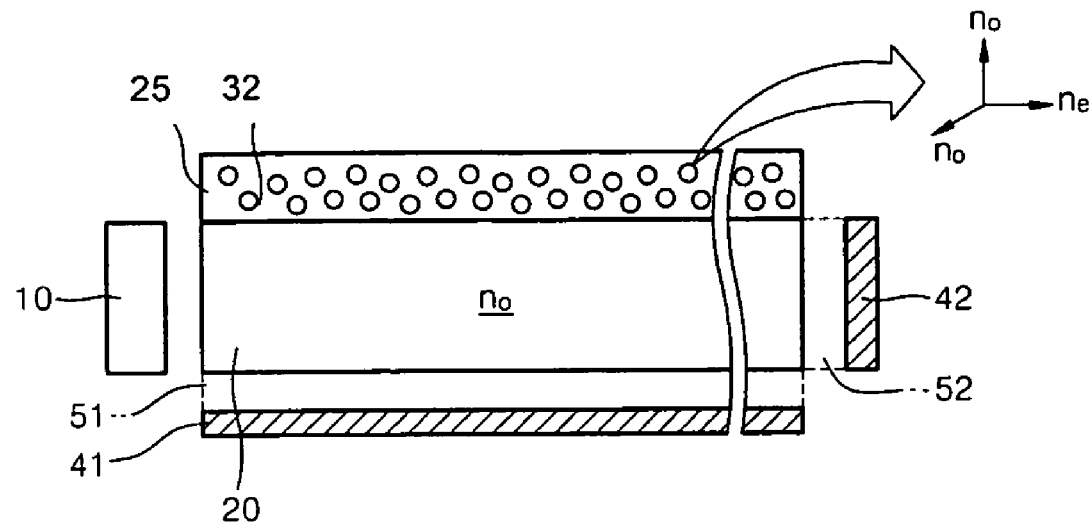
FIG. 5 is a cross-sectional view of an illumination system having a light emitting layer in which polarization sensitive scattering elements (PSSE) are dispersed on a top surface of the light guide plate according to another exemplary embodiment of the present invention.

FIG. 5 is a cross-sectional view of an illumination system having polarization sensitive scattering elements (PSSE) dispersed on a top surface of the light guide plate according to another exemplary embodiment of the present invention. The light source 10, the light guide plate 20, bottom and side reflection mirrors 41 and 42, and the polarization converters 51 and 52, which may be selectively added, are similar to those of the illumination systems of FIGS. 1 and 3. The difference is that the top surface of the light guide plate 20 is planar without a solid structure, and there is a light emitting layer 25 in which PSSEs 32 are distributed over the light guide plate 20.

The light emitting layer 25 has a matrix made of an optically isotropic material and a plurality of PSSEs 32 which are the optical anisotropic material domain distributed in the matrix.

The matrix may have the same refractive index as the refractive index $n_o$ of the light guide plate 20, and may have a refractive index greater than the refractive index $n_o$ of the light guide plate 20. The PSSEs 32 have two different refractive indices $n_o$ and $n_e$, and one of the refractive indices is substantially the same as the refractive index of the matrix. The PSSEs 32 are aligned along a predetermined direction to have common optical directivity. For example, the PSSEs 32 can be aligned in the direction marked in the upper part of FIG. 5 to have two different refractive indices.

In the polarization and recycling operation of the light guide plate 20 and the light emitting layer 25, a second polarization element having the difference of refractive index with the matrix and the PSSEs 32 causes scattering at the interface of the matrix and the PSSEs 32, and a first polarization element which does not sense the difference of the refractive index passes the interface and is totally reflected at an interface with the exterior of the matrix to be recycled. This similar to the embodiments of FIGS. 1 through 4.

The second polarization element is scattered by the PSSE 32 and is then incident directly on the interface of the light emitting layer 25 and the exterior atmosphere, or is then reflected by the bottom reflection mirror 41 before being incident on the interface of the light emitting layer 25 and the exterior atmosphere. The second polarization element is incident on the interface of the light emitting layer 25 and the exterior atmosphere at a small incident angle. The first polarization element is repeatedly totally reflected within the illumination system and is depolarized by the slight optical anisotropy of the light guide plate or by a polarization converter 51 or 52, and is polarized again in the above described manner.

The PSSEs 32 may be made of various materials having optical anisotropy, for example, a liquid crystal. That is, the light emitting layer 25 may be a polymer dispersed liquid crystals (PDLC) in which a liquid domain is dispersed in a transparent polymer matrix and aligned along a predetermined direction.

Figure 6:
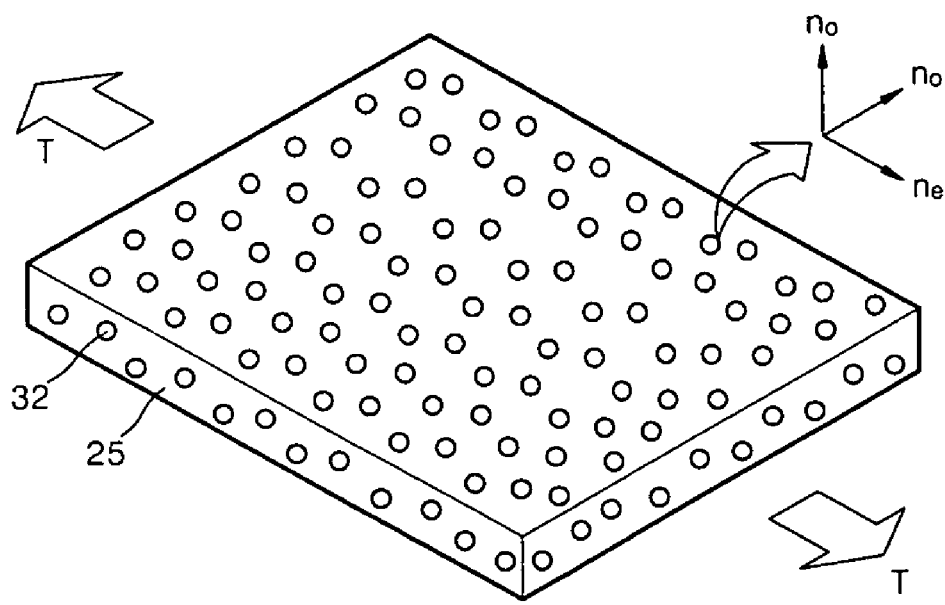
FIG. 6 is a cross-sectional view of an exemplary light emitting layer having dispersed PSSEs according to another exemplary embodiment of the present invention.

FIG. 6 is a cross-sectional view of an example of a light emitting layer having aligned PSSEs. The light emitting layer 25 may be made of a matrix, of which the refractive index is not substantially changed with respect to tensile deformation and PSSEs 32, the refractive index of which is changed by tensile strain. Specifically, the PSSEs 32 may be polyethylenenaphthalate (PEN) and the matrix may be co-PEN.

When tension T is applied to such a matrix, a light emitting layer 25 having the PSSEs which are aligned by the tension T can be obtained, and a desired light guide structure can be obtained by bonding the light emitting layer 25 in a tensed state on the top surface of the light guide plate 20.

In the illumination system for a flat panel display device according to the present invention, energy efficiency is improved using a light guide structure in which light generated from a light source at an end of the illumination system is radiated uniformly onto a display panel and one polarization component is separated and emitted and the other polarization component is recycled within the light guide structure.

Furthermore, light incident on the light guide structure can be efficiently separated without an additional collimation unit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An illumination system for a flat panel display device comprising:
   a light guide plate comprising an optically isotropic material;
   a light source disposed at a side of the light guide plate
   an upper layer, formed of an optically anisotropic material, disposed on a top surface of the light guide plate, wherein the upper layer has two different refractive indices, and one of the two refractive indices is the same as a refractive index of the light guide plate; and
   a polarization selection emitting structure disposed at an interface of the light guide plate and the upper layer, the light guide plate and the upper layer contacting each other at the interface, wherein differently polarized light is differently refracted, reflected, diffracted, or scattered based on polarization direction.

2. The illumination system of claim 1, wherein the upper layer comprises an optically anisotropic film having two different directional refractive indices within the plane of the upper layer, and wherein the polarization selection emitting structure comprises a fine solid structure bonded on a top surface of the light guide plate.

3. The illumination system of claim 2, wherein the fine solid structure comprises a micro lens array.

4. The illumination system of claim 2, wherein the fine solid structure comprises a hologram pattern.

5. The illumination system of claim 2, wherein the fine solid structure comprises a non-periodic fine uneven structure formed using an etching method or a sand blast method.

6. The illumination system of claim 1, further comprising a reflection mirror disposed on a bottom surface of the light guide plate.

7. The illumination system of claim 6, further comprising a polarization converter comprising an optically anisotropic material disposed between the light guide plate and the reflection mirror.

8. The illumination system of claim 7, wherein the polarization converter has a first directional refractive index in the plane of the polarization converter and a second directional refractive index, different from the first directional refractive index, perpendicular to the plane of the polarization converter.

9. An illumination system for a flat panel device comprising:
a light guide plate comprising an optically isotropic material;
a light source disposed at a side of the light guide plate; and
a light emitting layer, comprising an optically isotropic matrix and a plurality of polarization sensitive scattering elements (PSSEs) which comprise an optically anisotropic material domain distributed in the matrix and aligned to have common optical directivity, wherein the light emitting layer is disposed on a top surface of the light guide plate and has the same refractive index as the refractive index of the light guide plate;
wherein the matrix of the light emitting layer is made of a material, the refractive index of which does not vary with respect to tension and the polarization sensitive scattering elements (PSSEs) are made of a material, the refractive index of which varies with respect to tensile deformation, and the light emitting layer is deformed by tensile deformation in one direction.

10. An illumination system for a flat panel device comprising:
a light guide plate comprising an optically isotropic material;
a light source disposed at a side of the light guide plate;
a light emitting layer, comprising an optically isotropic matrix and a plurality of polarization sensitive scattering elements (PSSEs) which comprise an optically anisotropic material domain distributed in the matrix and aligned to have common optical directivity, wherein the light emitting layer is disposed on a top surface of the light guide plate and has the same refractive index as the refractive index of the light guide plate;
a reflection mirror disposed on a bottom surface of the light guide plate; and
a polarization converter comprising an optically anisotropic material disposed between the light guide plate and the reflection mirror.

11. The illumination system of claim 10, wherein the polarization converter has a first directional refractive index in the plane of the polarization converter and a second directional refractive index, different from the first refractive index, in a direction perpendicular to the plane of the polarization converter.

* * * * *